United States Patent [19]

Tietze et al.

[11] 3,787,774

[45] Jan. 22, 1974

[54] FILTER CIRCUITRY

[75] Inventors: Ulrich Tietze, Erlangen; Erich Courtin, Sindelfingen; Stefan Traub, both of Boblingen, all of Germany

[73] Assignee: Hewlett-Packard GmbH, Boblingen, Germany

[22] Filed: Aug. 28, 1972

[21] Appl. No.: 284,389

[30] Foreign Application Priority Data

Aug. 31, 1971 Germany .......................... 2143560

[52] U.S. Cl. ................................ 328/167, 328/133

[51] Int. Cl. ........................................... H03b 1/04

[58] Field of Search ..................... 328/165, 167, 133

[56] References Cited

UNITED STATES PATENTS

| | | | |
|---|---|---|---|
| 3,218,559 | 11/1965 | Applebaum | 328/165 X |
| 3,375,451 | 3/1968 | Borelli et al | 328/165 X |
| 3,550,023 | 12/1970 | Webb | 328/165 |
| 3,571,629 | 3/1971 | Hilberman | 328/165 X |

*Primary Examiner*—John S. Heyman
*Attorney, Agent, or Firm*—A. C. Smith

[57] ABSTRACT

Circuitry for filtering a distinct variable spectral component includes a band-rejection filter formed by a summing amplifier with a feedback loop and a bandpass-filter connected to one of its inputs. The summing amplifier is connected to form the difference between the unfiltered spectrum at one of its inputs and the spectrum component to be suppressed at another of its inputs. The summing amplifier delivers the filtered signal spectrum at its output. A control circuit locks the common center frequency of the bandpass and band-rejection filters to the frequency of the spectral component to be suppressed.

9 Claims, 1 Drawing Figure

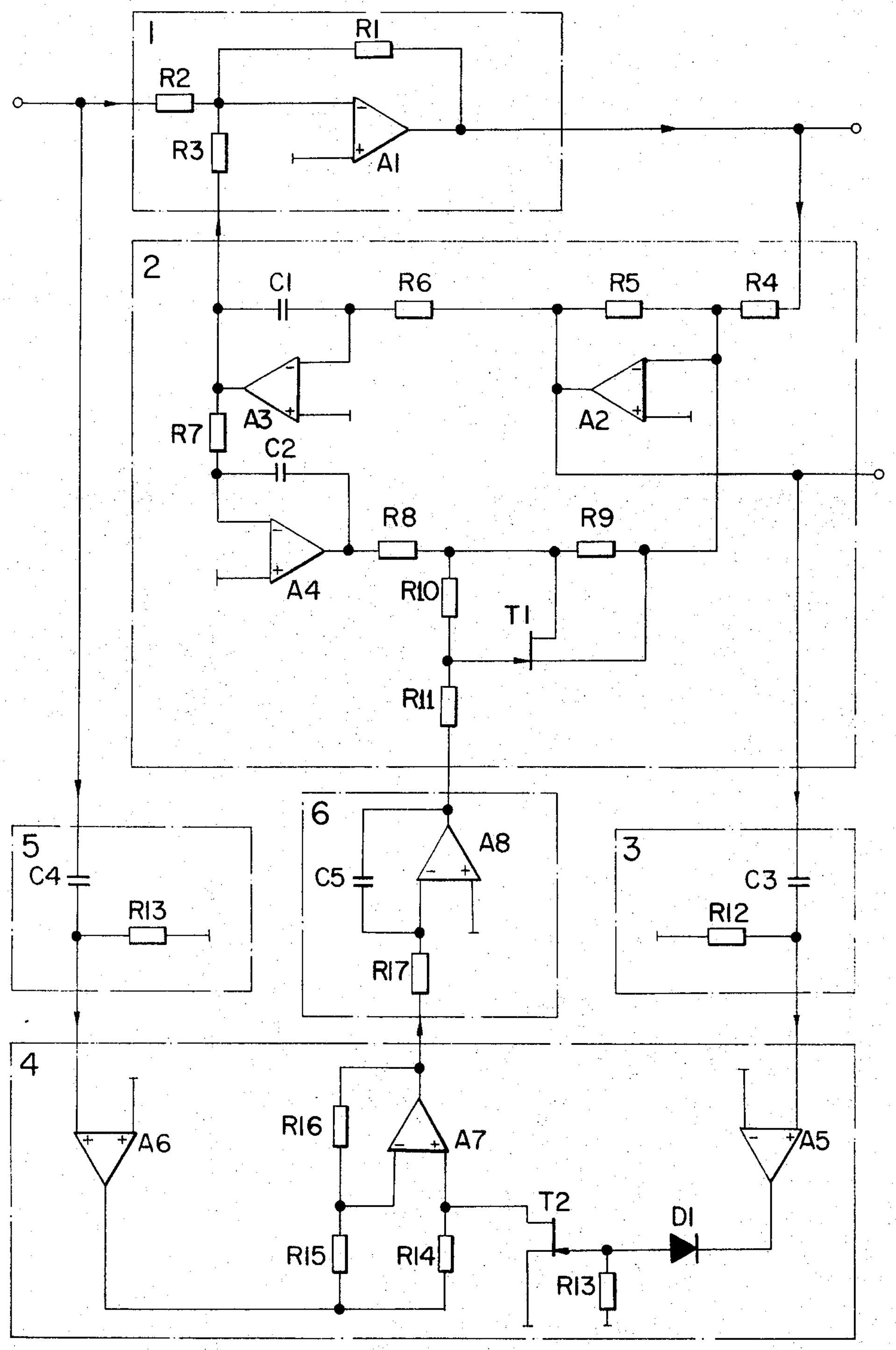
1
R1
R2
R3
A1
2
C1
R6
R5
R4
A3
A2
R7
C2
A4
R8
R9
R10
T1
R11
6
A8
C5
R17
5
C4
R13
3
C3
R12
4
A6
R16
A7
A5
R15
R14
T2
D1
R13

FILTER CIRCUITRY

BACKGROUND OF THE INVENTION

Apparatus for measuring distortion factors in input signals having selectively suppressed fundamental wave forms is well known. Typically the undesired signal is suppressed by a filter circuit to allow measurement of the contents of subtones in the input spectrum. The input signal is supplied to a band-rejection filter, the center frequency of which is locked by a control circuit to the frequency of the fundamental to be suppressed. For this purpose a phase detector compares the phase relationship of the output spectrum from the band-rejection filter with the input spectrum, to derive an error signal for the control circuit. This control circuit adjusts the center frequency of the band rejection filter to make the mean value of the input voltage of the control circuit zero. This is the case when the amplitude of the fundamental at the output of the band-rejection filter is zero. Thus, this circuitry can only eliminate a spectral component having the greatest amplitude within the whole input spectrum. Furthermore, the operation of this type of filter makes it necessary to use a second controller to ensure that the signal component with a phase shift of 90° relative to the fundamental is eliminated.

SUMMARY OF THE INVENTION

A major object of the present invention is to provide circuitry for eliminating a spectral component of varying frequency within predetermined limits from a frequency spectrum. The amplitude of the frequency component to be suppressed may be smaller than the remaining components of the spectrum outside of the predetermined frequency limits. A further object of the invention is to provide circuitry which operates automatically to suppress the unwanted component without affecting the information content of the signal spectrum.

Typifying this measuring problem are electrocardiographic signals. These often have a superimposed unwanted main voltage component of 60 hertz. This main voltage varies within relatively narrow frequency limits and it is desirable to eliminate it without suppressing or distorting adjacent frequency components.

Accordingly the invention provides circuitry for suppressing a variable frequency spectral component of an input spectrum. The circuitry includes a summing circuit with an input connected to receive the input spectrum and an output connected to deliver the filtered output spectrum. A bandpass circuit is connected in a feedback loop of the summing circuit. A phase comparison circuit has inputs connected to receive signals representative of the input spectrum and signals representative of the output spectrum. The polarity of these signals is used to generate a control signal responsive to the phase relationship between the spectral component to be suppressed and the component with the same frequency. A control circuit is connected to receive the control signal from the phase comparison circuit. Its output is connected to make the common center frequency of the bandpass and band-rejection circuits closely follow frequency variations of the spectral component to be suppressed. The circuitry described above eliminates an unwanted frequency component from an input spectrum. The frequency component may be smaller than the remaining signal components, but should be greater than the signal components in the immediately surrounding spectrum.

According to a preferred embodiment of the invention there is an integrating controller. Such a controller enables suppressing a spectral component having amplitude smaller than the amplitudes of other spectral components within the variation range of the unwanted frequency as long as the integrated value of the spectral component to be suppressed exceeds the integrated values of other spectral components within the same frequency limits.

DESCRIPTION OF THE DRAWING

The FIGURE shows a schematic of the preferred embodiment of the filter circuitry.

DESCRIPTION OF THE PREFERRED EMBODIMENT

The circuitry includes a summing circuit 1 with a first input for the signal spectrum to be filtered and a second input for the output signal of a bandpass filter 2. As will be explained later, the output signal from bandpass filter 2 corresponds to the spectral component to be suppressed with negative polarity; thus at the output of the summing circuit a signal is obtained which no longer contains the unwanted signal component. This output signal is supplied to the input of bandpass filter 2 which supplies a signal to one input of a phase detector 4 via a first high-pass filter 3. In the steady state condition of the circuitry, this signal will correspond to the signal component to be suppressed with a phase shift of 90° relative to the component of the signal spectrum having the same frequency. The later component is supplied to the other input of the phase detector via a second high-pass filter 5. From the phase difference between the signal components with same frequency, the phase detector will derive a signal for a controller 6 which will adjust the center frequency of the bandpass 2 to make the voltage at the input of the controller approach zero. The bandpass filter is part of the feedback of the summing circuit 1, and the summing circuit and the bandpass filter form a band-rejection filter which will have the same center frequency as the bandpass filter. At the output of the band-rejection filter, a signal spectrum corresponding to the input signal spectrum, but without the unwanted signal component is obtained.

Details of the aforementioned circuits will now be discussed: The summing circuit 1 includes an operational amplifier A1 and resistors R1, R2 and R3. The output of the summing circuit is connected to resistor R4 at the input of bandpass filter 2.

Bandpass filter 2 includes an input inverter which forms a closed circuit with two integrators. The output of the first integrator is connected to resistor R3 and the output of the second integrator is connected with the output of the controller 6, and through a controllable resistor combination with the input inverter.

The inverter includes an operational amplifier A2 and a resistor R5. The amplifier is serially connected to input resistor R4 and to an input resistor R6 of the first integrator.

The first integrator includes an operational amplifier A3 and a capacitor C1. The amplifier is connected to the second integrator via resistor R7.

The second integrator includes an operational amplifier A4 with a capacitor C2. This amplifier is connected to the inverting input of the inverter via resistors R8 and R9. A field effect transistor T1 is connected in parallel with resistor R9. The gate electrode of the field effect transistor is connected between resistors R10 and R11. These resistors are connected between resistors R8 and R9. Resistors R8 through R11, and the field effect transistor T1, form a variable resistor which determines the gain of inverter A2, and thus the resonant frequency of the bandpass filter.

The high-pass filter 3 includes a capacitor C3 connected between the inverter of band-pass filter 2 and the input of the phase detector 4, and a resistor R12 connected between ground and capacitor C3.

The high-pass filter 5 includes a capacitor C4 and a resistor R13 connected to ground. Capacitor C4 is connected between the input of the circuitry and the second input of the phase detector. Both high-pass filters are designed to effect the same phase shift.

The phase detector 4 includes two input square wave formers and a synchronous rectifier connected to the square wave formers.

The two square wave formers include operational amplifiers A5 and A6 which are operated in the saturation range. The first square wave former is connected to high-pass filter 3 at its non-inverting input, and to ground at its inverting input. The input connections of the second square wave former are the opposite.

The first square wave former is connected to the gate electrode of a field effect transistor T2 via a diode D1, and to ground via a resistor R13. The source-electrode of the field effect transistor T2 is connected to ground, while its drain-electrode is connected to the non-inverting input of an operational amplifier A7. The non-inverting input of the operational amplifier is also connected to the output of the second square wave former via a resistor R14. Its inverting input is connected to the output of square wave former A6 via an input resistor R15. A resistor R16 is connected in the feedback path of operational amplifier A7. The amplifier is also connected to the inverting input of controller 6 via resistor R17.

The controller 6 is an integrator and includes operational amplifier A8 and capacitor C5.

The circuitry operates as follows: The input signal with all its signal components including the spectral components to be suppressed is supplied to the signal input of the phase detector 4 via high-pass filter 5 and to the switching input of phase detector 4 via the summing circuit 1. The input signal is also supplied to bandpass filter 2 and to high-pass filter 3. While the relative phase difference of the components with the same frequency at both detector inputs is not shifted by high-pass filters 3 and 5, the signal from the inverter output of band-pass filter 2 has a phase angle relative to the unwanted component in the input signal at the high-pass filter 5 which is 90° different from the non-steady condition of the circuitry. In the square wave formers A5 or A6, the signals are shaped into square wave voltages with constant phase and constant amplitude, respectively. Prior to this high-pass filters 3 and 5 have eliminated any line variations.

The output signals of both square wave formers A5 and A6 are multiplied by the transistor switch T2 and the operational amplifier A7 in a known manner. Transistor switch T2 and resistors R14 and R16 make the gain of operational amplifier A7 +1 or −1 depending upon the polarity of the switching signal at the output of square wave former A5. Thus, at the output of operational amplifier A7 a square wave voltage will appear dependent on the phase relationship of the signals at the signal and switching inputs of the phase detector. The square wave signal at the output of the synchronous rectifier is integrated in the integrating controller 6. The field effect transistor T1 operates as a variable resistor and shifts the resonant frequency of the bandpass filter in a known manner as long as the mean value of the input voltage at the input of the integrating controller is zero. This is the case, when the phase difference between the signal components at the switching input and the signal input of the phase detector is 90°, or the pulse duty factor is 1 :: 1. In the later case the output voltage of bandpass filter 2 has a phase shift of 180° relative to the unwanted component in the input spectrum.

When the resonant frequency of the bandpass filter is adjusted to correspond to the actual frequency of the signal component to be suppressed, the bandpass filter will supply a signal to the summing circuit 1 via the resistor R3. This signal will correspond to the frequency component to be suppressed. The signal at the one input of the summing circuit has a phase shift of 180° relative to the signal component to be suppressed. This component is present at resistor R2. As the band-rejection filter consisting of summing amplifier A1 and bandpass filter 2 is always tuned to the frequency of the spectral component to be suppressed, the amplitude of the unwanted frequency component at the summing input of the adding circuit 1 will be zero. Thus, at the output of the adding circuit the signal corresponds to the input signal spectrum less the suppressed spectral component.

It should be obvious that the bandpass filter, the phase detector control, the phase detector, the synchronous rectifier, and the controller can be realized in different ways. The preferred embodiment, however, incorporates the following advantages:

a. For all settings of gain and resonant frequency, as determined by controller 6 and resistor R4, the bandpass filter 2, including the three operational amplifiers A2, A3 and A4, will operate as an unattenuated resonant circuit while attenuating all other frequencies.

b. The use of bandpass filter 2 in the feedback of summing amplifier A1 establishes a band-rejection filter without need for additional filters. The center frequency of the band-rejection filter is identical with the center frequency of the bandpass filter for all adjusted resonant frequencies of the bandpass filter.

c. As the bandpass filter 2 has substantial gain at its resonant frequency, the output voltage of the summing circuit can be made arbitrarily small at the resonant frequency, i.e., the unwanted frequency. Thus, practically complete amplitude tuning can be obtained without the additional control circuit.

d. The selectivity of the bandpass filter and the band-rejection filter can be easily adjusted by changing resistor R4.

e. The first square wave former A5 allows the phase comparison to be made with a synchronous rectifier. A more expensive multiplier circuit is unnecessary. The use of square wave formers at the switching input and at the signal input of the synchronous rectifier results in a constant sensitivity of the phase detector independent from the amplitude of the unwanted signal component. The constant sensitivity of the phase detector also permits a constant transient time and an increased dynamic range for the unwanted signals.

f. The required phase difference for the steady state condition of the synchronous rectifier results from the connection of the inverter A2 with the switching input of the phase detector 4, and the coupling of the signal spectrum at the switching input of the phase detector. A separate 90° phase shifter circuit is not necessary.

Finally, the circuitry has the advantage that the signal component eliminated from the output spectrum, can be obtained from the bandpass filter.

We claim:

1. Circuitry for filtering a periodic component of selected frequency from an input spectrum comprising:

a summing circuit having one input connected to receive an input spectrum to be filtered and having another input for producing an output as a selected combination of the signals applied to the inputs thereof;

frequency-determining means connected in feedback relation between the output and said other input of the summing circuit for providing a feedback signal to the summing circuit containing the frequency component to be filtered;

phase comparison means having a first input connected to receive the input spectrum and having a second input connected to receive a signal representative of the frequency component to be filtered; and a control circuit connected to the phase comparison circuit and responsive to the phase difference of signals applied to the inputs of said phase comparison means for supplying an output to said frequency-determining means to adjust the frequency determined thereby to said frequency component to be filtered.

2. Circuitry as in claim 1 wherein the frequency-determining means includes an inverter and two integrators connected in cascade to form a resonant loop.

3. Circuitry as in claim 1 wherein a resistive element is connected between the frequency-determining means and the summing circuit.

4. Circuitry as in claim 1 wherein the summing circuit includes a summing amplifier.

5. Circuitry as in claim 1 wherein the control circuit includes an integrator.

6. Circuitry as in claim 2 wherein the frequency-determining means includes an output from said inverter for supplying said frequency component filtered from the input spectrum.

7. Circuitry as in claim 6 wherein the phase comparison means includes a first square wave former connected between the output of the frequency-determining means and the second input of the phase comparison means.

8. Circuitry as in claim 7 wherein a second square wave former is connected between the spectrum input and the first input of the phase comparison circuit means.

9. Circuitry as in claim 6 comprising:

a first high-pass filter connected between the spectrum input and the first input of the phase comparison means; and a second high-pass filter connected between the second input and the output from said inverter of the frequency-determining means.

* * * * *